(12) United States Patent
Vashist et al.

(10) Patent No.: US 8,769,677 B2
(45) Date of Patent: Jul. 1, 2014

(54) SYSTEM AND METHOD FOR SPAMMER HOST DETECTION FROM NETWORK FLOW DATA PROFILES

(75) Inventors: Akshay Vashist, Plainsboro, NJ (US); Yitzchak M. Gottlieb, Edison, NJ (US); Abhrajit Ghosh, Edison, NJ (US); Yukiko Sawaya, Fujimi (JP); Ayumu Kubota, Saitama (JP)

(73) Assignees: Telcordia Technologies, Inc., Piscataway, NJ (US); KDDI Corporation, Chiyoda-ku (JP)

( * ) Notice: Subject to any disclaimer, the term of this patent is extended or adjusted under 35 U.S.C. 154(b) by 0 days.

(21) Appl. No.: 13/547,174

(22) Filed: Jul. 12, 2012

(65) Prior Publication Data
US 2014/0020066 A1    Jan. 16, 2014

(51) Int. Cl.
*G06F 11/00* (2006.01)

(52) U.S. Cl.
USPC .............................................. 726/22; 726/23

(58) Field of Classification Search
CPC ............ H04L 63/1416; H04L 63/1425; H04L 63/145; H04L 63/20; G06F 17/30864
USPC ........................ 726/2–4, 11, 13, 14, 22–25; 709/206–207, 223–225, 227; 707/709
See application file for complete search history.

(56) References Cited

U.S. PATENT DOCUMENTS

| | | | |
|---|---|---|---|
| 7,949,716 B2 * | 5/2011 | Alperovitch et al. ......... 709/206 |
| 2006/0015942 A1 * | 1/2006 | Judge et al. ..................... 726/24 |
| 2009/0089244 A1 | 4/2009 | Donato et al. | |
| 2009/0089285 A1 | 4/2009 | Donato et al. | |
| 2009/0089373 A1 | 4/2009 | Donato et al. | |
| 2009/0254989 A1 | 10/2009 | Achan et al. | |

OTHER PUBLICATIONS

C. Castillo, D. Donato, A. Gionis, V. Murdock and F. Silvestri, "Know Your Neighbors: Web Spam Detection Using the Web Topology," In Proceedings of the 30th Annual International ACM SIGIR Conference on Research and Development in Information Retrieval, ACM, New York, NY, USA, pp. 423-430, 2007.

G. Vliek, "Detecting Spam Machines, A Netflow-Data Based Approach," Masters Thesis, University of Twente, The Netherlands 2009.

H. Choi, H. Lee, H. Kim, "BotGAD: Detecting Botnets by Capturing Group Activities in Network Traffic," Proceedings of the Fourth International ICST Conference on Communication System Software and Middleware. Comsware 2009.

A. J. Kalafut, C. A. Shue, M. Gupta, "Malicious Hubs: Detecting Abnormally Malicious Autonomous Systems,"Infocom, pp. 1-5, 2012.

(Continued)

*Primary Examiner* — Hosuk Song
(74) *Attorney, Agent, or Firm* — Philip J. Feig

(57) ABSTRACT

A system and method for spammer host detection from network flow data profiles comprises constructing one or more cluster profiles and detecting spammer hosts. Construction cluster profiles comprises observing network flow data from one or more hosts; for each host, representing the network flow data associated with the host as a multidimensional vector; clustering the vectors of the hosts into the plurality of cluster profiles; annotating each cluster profile using at least one of black lists and white lists; and calculating a confidence in each cluster profile annotation. Detecting spammer hosts comprises observing the network flow data from a new host; representing the network flow data associated with the new host as a multidimensional vector, and placing the new multidimensional vector of the new host into one cluster profile of the one or more cluster profiles.

9 Claims, 3 Drawing Sheets

(56) References Cited

OTHER PUBLICATIONS

M. Konte, N. Feamster, J. Jung, "Dynamics of Online Scam Hosting Infrastructure," Proceedings of the 10th International Conference on Passive and Active Network Measurement. PAM 2009.

Y. Zeng, X. Hu, K. G. Shin, "Detection of Botnets Using Combined Host-and Network-Level Information," DSN pp. 291-300, 2010.

S. Hao, N. A. Syed, N. Feamster, A. G. Gray, S. Krasser, "Detecting SPammers with SNARE: Spatio-Temporal Network-Level Automatic Reputation Engine," Proceedings of the 18th Conference on USENIX Security Symposium. SSYM 2009.

Y. Xie, F. Yu, K. Achan, R. Panigrahy, G. Hulten, I. Osipkov, "Spamming Botnets: Signatures and Characteristics," SIGCOMM 2008.

Z. Qian, Z. M. Mao, Y. Xie, F. Yu, "On Network-Level Clusters for Spam Detection," Proceedings of the 17th Annual Network & Distributed System Security Symposium. NDSS 2010.

W.K. Ehrlich, A. Karasaridis, D. Liu and D. Hoeflin, "Detection of Spam Hosts and Spam Bots Using Network Flow Traffic Modeling," Proceedings of the 3rd USENIX Conference on Large-Scale Exploits and Emergent Threats: Botnets, Spyware, Worms, and more. LEET 2010.

\* cited by examiner

SYSTEM AND METHOD FOR SPAMMER HOST DETECTION FROM NETWORK FLOW DATA PROFILES

FIELD OF THE INVENTION

This invention relates generally to data analysis, network and information security and machine learning.

BACKGROUND OF THE INVENTION

Spam hosts are web hosts that provide unsolicited advertisements and/or email messages. These spam hosts exist solely to get advertisements viewed by users.

A variety of methods have been proposed to detect spam hosts. Depending on how the spam detection decision rules are constructed, existing detection methods or solutions can typically be separated into two categories: expert system based and supervised learning based. In the expert system based solutions, experts encode the rules which are then used to decide whether a new host is a spammer or not. Such rules may be derived from either payload properties or traffic properties, or from a combination of both, or from deriving properties of infrastructure hosting spammers such as botnet memberships. Major drawbacks of systems using this approach are the lack of adaptability to future traffic when traffic characteristics change over time, lack of portability to new networks since specific characteristics can be very different across networks, limited coverage of decision rules as an expert can provide rules only for the subset of cases she/he understands, and difficulty in modifying the rules as modifications are done manually.

The supervised learning based solution is more flexible and overcomes many of the shortcomings of the expert systems approach. There are also approaches that identify spammers based on IP-level clusters where hosts are clustered based on their IP addresses alone; these approaches apply only to hosts which share part of their IP address with spammers.

In the supervised learning approach, one begins with a collection of hosts, each labeled as a spammer or a non-spammer, and the hosts' traffic patterns (training data), and automatically learns a decision rule to classify new hosts as spammers or not. While this works fine as long as new hosts have traffic patterns similar to those in the training data, the performance deteriorates when new traffic patterns emerge. These new patterns may correspond to spammers or non-spammers. This supervised learning approach also does not perform well when traffic patterns begin to deviate from the initial set because conceptual categories are not learned but rather one learns to classify categories whose instances are provided in the initial training data. The other drawback is the requirement of a fairly curated collection of spammer hosts and their behaviors, which is hard to obtain in practice. In practice, identification of certain spammers may be known but their traffic patterns may not be known. At the other end of the spectrum, traffic patterns of many hosts can be observed, but one may not know whether they are spammers or not.

Existing solutions either assume a strong a priori knowledge of fixed characteristics of spamming hosts or assume an explicit knowledge of which hosts are spammers. Solutions based on either of these are not realistic because spammer characteristics change over time and we may not know which hosts are truly spammers. Essentially, spammer detection remains a challenging and an open problem.

SUMMARY OF THE INVENTION

Novel techniques are presented to detect spammer hosts on the internet by clustering on patterns of traffic these hosts send out to various ports and destinations. These techniques overcome the drawbacks of both of the approaches discussed above. The inventive approach does not require known labels and the traffic patterns for the same set of hosts. In fact, the approach can use all the hosts observed in network traffic and traffic patterns without requiring knowledge of whether some of them are spammers or not; all of the hosts are automatically clustered based on similarities in their traffic patterns. Since the approach does not use a fixed (or a priori declared) notion of categories, it can bring out new subcategories of spammers and non-spammers.

A method for spammer host detection from network flow data profiles comprises steps of constructing one or more cluster profiles and detecting spammer hosts. Constructing cluster profiles comprises steps of observing network flow data from multiple hosts; for each host of the multiple hosts, representing the network flow data associated with the host as a multidimensional vector; clustering the vector representations of the multiple hosts into the plurality of cluster profiles; annotating each cluster profile using at least one of one or more black lists and one or more white lists; and calculating a confidence in each cluster profile annotation. Detecting spammer hosts comprises steps of observing the network flow data from a new host; representing the network flow data associated with the new host as a multidimensional vector; and placing the new multidimensional vector of the new host into one cluster profile of the one or more cluster profiles.

A system for spammer host detection from network flow data profiles comprises a CPU and a module operable to perform constructing one or more cluster profiles and detecting spammer hosts. Constructing cluster profiles comprises observing network flow data from multiple hosts; for each host of the multiple hosts, representing the network flow data associated with the host as a multidimensional vector; clustering the vector representations of the multiple hosts into the plurality of cluster profiles; annotating each cluster profile using at least one of one or more black lists and one or more white lists; and calculating a confidence in each cluster profile annotation. Detecting spammer hosts comprises observing the network flow data from a new host; representing the network flow data associated with the new host as a multidimensional vector; and placing the new multidimensional vector of the new host into one cluster profile of the one or more cluster profiles.

In one aspect, annotating each cluster profile comprises comparing each host in the plurality of cluster profiles with the black lists and the white lists; calculating a number of overlapping black list hosts and a number of overlapping white list hosts based on the hosts in the cluster profile; when the number of overlapping black list hosts is greater than a threshold value, annotating the cluster profile as a spammer; and when the number of overlapping white list hosts is greater than a threshold value, annotating the cluster profile as a non-spammer. In one aspect, placing the new multidimensional vector comprises comparing the new multidimensional vector with each of the plurality of clusters; and placing the new multidimensional vector in a cluster having a closest center.

A computer readable storage medium storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

An inventive solution to the need for spammer host detection is presented. The solution has two parts: (i) the profile construction phase shown in FIG. 1, and (ii) the spammer host detection phase shown in FIG. 2. The profile construction phase shown in FIG. 1 can usually be implemented offline, e.g., not in real-time, but this phase can be carded out in an online, real-time mode to update the profiles. The spammer host detection phase can be performed online in real-time. The profile construction phase clusters the patterns of traffic that various hosts send out to various ports and destinations, while the spammer host detection phase assigns profiles of new hosts to clusters constructed during the profile construction phase. The operations in the two phases are described below.

Figure 1:
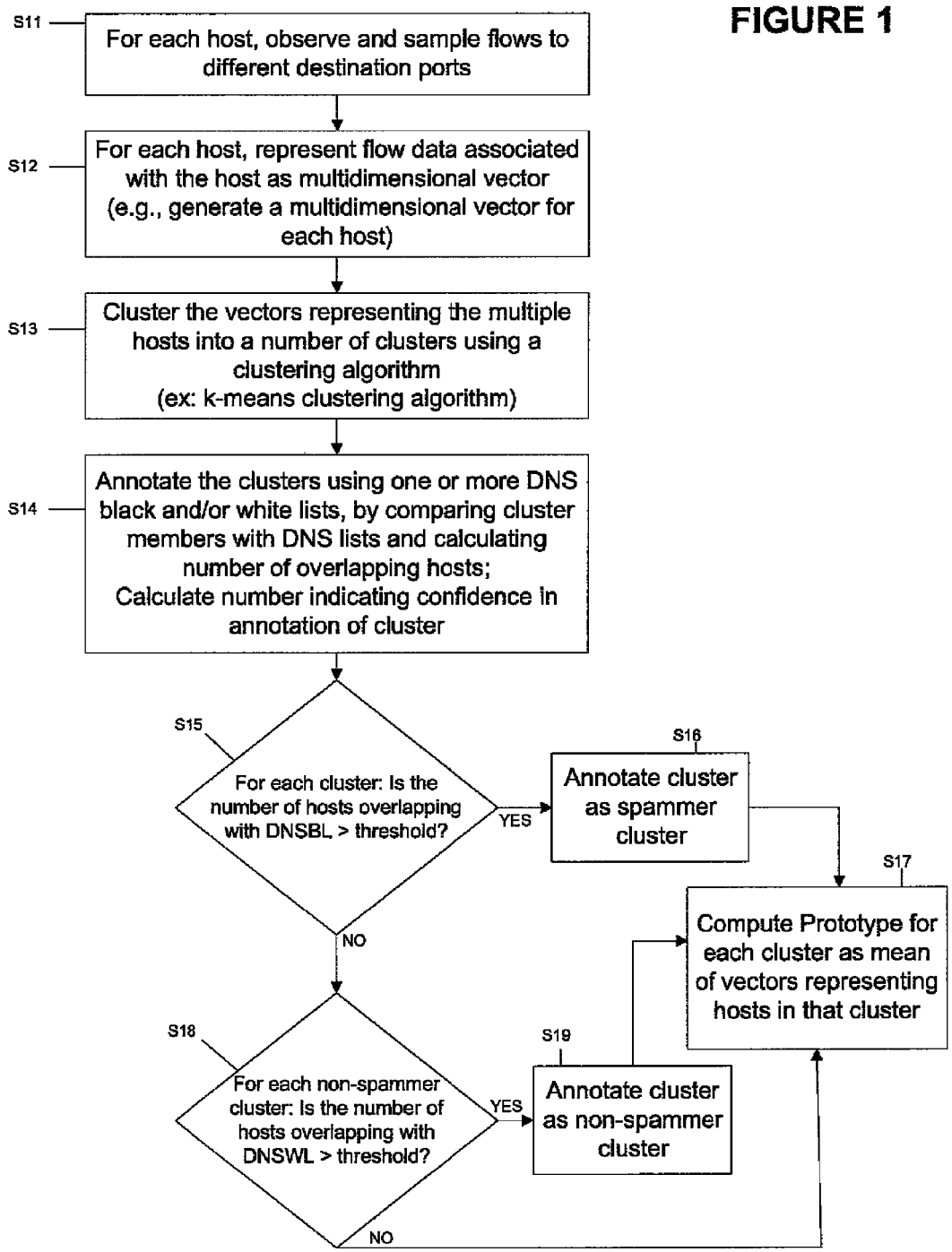
FIG. 1 is a flow diagram of the profile construction phase of the present invention.

In the profile construction phase shown in FIG. 1, in step S11, from each potential spammer host, observe and sample flows to different destination ports. In one embodiment, hosts that send out traffic on port 25 are considered as potential spammers. However, other criteria could be used to determine the potential spammers. In step S12, the flow data associated with the potential spammers or hosts from step S11 is aggregated over a period of time and is represented as and/or converted into a multidimensional vector. Each such vector represents one host.

In step S13, the vectors are clustered into a number of clusters using a clustering algorithm, such as the k-means clustering algorithm. The number of clusters is automatically decided by studying multiple clusterings over the data and is chosen such that hosts within a cluster exhibit similar flow data profiles while those from different clusters are diverse in flow data profiles.

In step S14, the clusters are annotated using one or more DNS (domain name service) black and white lists. The annotation analyzes the overlap of host addresses in a cluster with those present in DNS black lists and/or white lists to assess the homogeneity within a cluster. Also, the amount of overlap with black list(s) or white list(s) or mixture thereof is used to calculate a number indicating confidence in annotating the cluster. High values of confidence indicate reliability of annotation of the cluster; this confidence value is used during the spammer host detection stage where profiles of new hosts are assigned to annotated clusters. In step S15, determine whether more than a threshold fraction of hosts in a cluster overlaps with the DNS black list. In one embodiment, the threshold fraction can be greater than 0.5. In one embodiment, this value can be changed if the remaining hosts do not belong to any white list. If more than a threshold fraction of hosts in a cluster overlaps with those in the black list (S5=YES), the cluster is annotated as a spammer cluster in step S16. In step S17, a prototype for each cluster is computed as the mean of the vectors representing profiles of hosts in that cluster; geometrically, the mean vectors correspond to the center of the cluster.

If the cluster does not have a number of hosts above the threshold value (S15=NO), then determine whether the number of hosts overlapping with the DNS white list is greater than a threshold value. If so (S18=YES), then the cluster is annotated as a non-spammer cluster in step S19. Processing continues with the next cluster at step S17.

Steps S11 and S12 are performed for each host. Steps S14 through S19 (as appropriate) are performed for each cluster.

Figure 2:
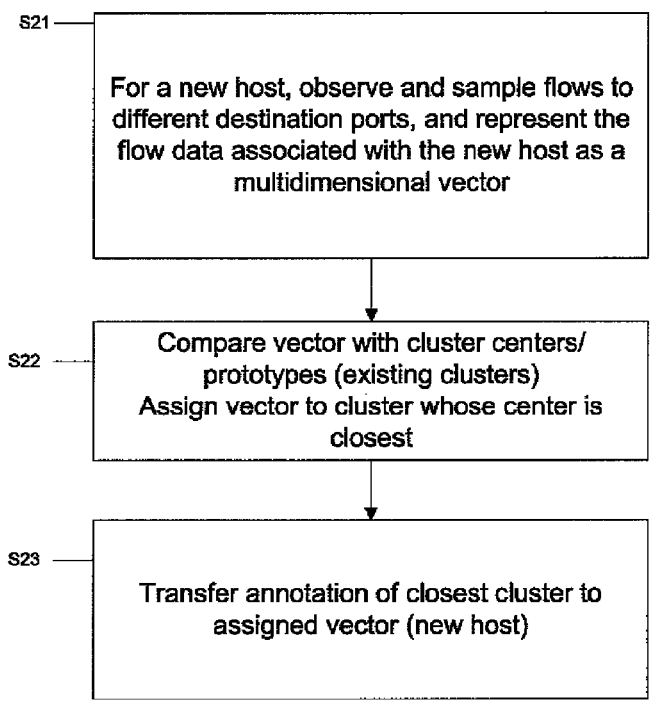
FIG. 2 is a flow diagram of the spammer detection phase of the present invention.

FIG. 2 is a flow diagram of the spammer detection phase of the present invention. In step S21, a new host, e.g., a host that has not already been processed, is observed and raw flow data to different destination ports are sampled. In addition, the raw flow data associated with this new host is converted into a multidimensional vector.

In step S22, the new vector is compared to the clusters. In step S23, the new vector is assigned to a cluster; this assignment is based on the location of the cluster center. Typically, the new vector is assigned to the cluster whose center is closest to the new vector. The assignment copies the annotation of the new vector from the cluster, so that if the cluster is annotated as a spammer, the new host (represented by its vector) is annotated as a spammer and if the cluster is annotated as a non-spammer, the new host (represented by its vector) is annotated as a non-spammer.

The information collected and processing performed in step S14 of FIG. 1 is basically the same as that of step S23 of FIG. 2. However, in step S23 in FIG. 2, clusters are used to detect new spammers, not merely to annotate clusters. In other words, in step S14, the cluster annotations are derived and in step S23, the cluster annotations are used to make decisions about a new host.

Likewise, the information collected and processing performed in steps S11 and S12 of FIG. 1 is basically the same as that of step S21 of FIG. 2. However, the results of these steps are used in different ways in the profile construction and the spammer detection phases. In the spammer detection phase, the prototype, e.g., the cluster centers or the mean, along with the annotation of the cluster, is used to judge new hosts as spammers.

The novel approach for spammer detection does not require knowledge of either labels or the traffic patterns for the same set of hosts. In fact, the approach can use all the hosts observed in network traffic and traffic patterns without knowing whether some of them are spammers or not. Instead, the hosts are automatically clustered based similarities in their traffic patterns. Since the approach does not use a fixed (or a priori declared) notion of categories, it can bring out new subcategories of spammers and non-spammers. Furthermore, the inventive process can be periodically automatically repeated to discover any new subcategories that may have emerged. The approach analyzes the network flows and makes minimal assumptions about the traffic characteristics, so it is both fast and general. The speed of the approach allows it to detect spammer hosts in a large network.

The novel methodology uses DNS black lists and DNS white lists only to annotate clusters/categories once they have been automatically discovered. New hosts are assigned to clusters based on the distance to cluster centers and then cluster annotation is transferred to hosts.

Figure 3:
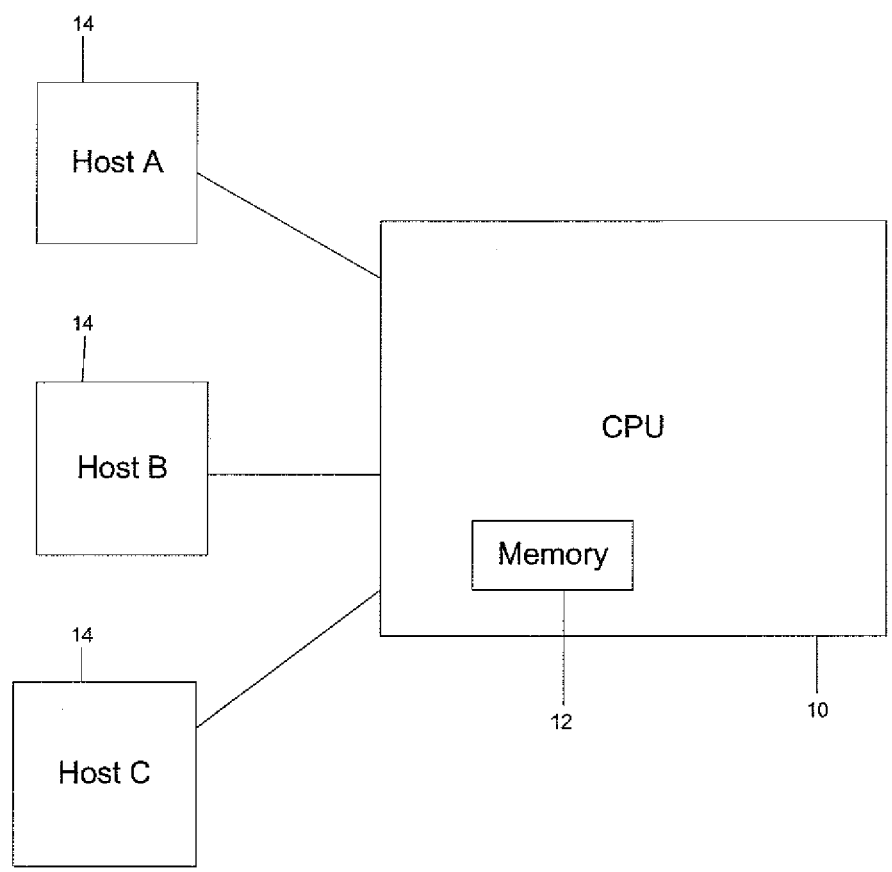
FIG. 3 is a schematic diagram of the inventive system.

FIG. 3 shows a schematic diagram of an embodiment of the inventive system. This system comprises a CPU 10 and memory 12 along with hosts 14 on the internet. Three hosts 14 are shown, but any number of hosts can be used in the system. In this inventive system, the hosts transmit information over the internet (not shown) to the CPU 10. The CPU can execute modules that perform the steps described in FIGS. 1 and 2 above. The CPU can store the generated multidimensional vectors in its memory 12.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for spammer host detection from network flow data profiles, comprising steps of:
    constructing one or more cluster profiles, comprising steps of:
        observing network flow data from one or more hosts;
        for each host of the one or more hosts, representing the network flow data associated with the host as a multidimensional vector;
        clustering the one or more vectors of the one or more hosts into the plurality of cluster profiles;
        annotating each cluster profile using at least one of one or more black lists and one or more white lists; and
        calculating a confidence in each cluster profile annotation; and
    detecting spammer hosts, comprising steps of:
        observing the network flow data from a new host;
        representing the network flow data associated with the new host as a multidimensional vector; and
        placing the new multidimensional vector of the new host into one cluster profile of the one or more cluster profiles.

2. The method according to claim 1, the step of annotating each cluster profile comprising:
    comparing each host in the plurality of cluster profiles with the black lists and the white lists;
    calculating a number of overlapping black list hosts and a number of overlapping white list hosts based on the hosts in the cluster profile;
    when the number of overlapping black list hosts is greater than a threshold value, annotating the cluster profile as a spammer; and
    when the number of overlapping white list hosts is greater than a threshold value, annotating the cluster profile as a non-spammer.

3. The method according to claim 1, the step of placing the new multidimensional vector comprising:
    comparing the new multidimensional vector with each of the plurality of clusters; and
    placing the new multidimensional vector in a cluster having a closest center.

4. A non-transitory computer readable storage medium storing a program of instructions executable by a machine to perform a method for spammer host detection from network flow data profiles, comprising:
    constructing one or more cluster profiles, comprising:
        observing network flow data from one or more hosts;
        for each host of the one or more hosts, representing the network flow data associated with the host as a multidimensional vector;
        clustering the one or more vectors of the one or more hosts into the plurality of cluster profiles;
        annotating each cluster profile using at least one of one or more black lists and one or more white lists; and
        calculating a confidence in each cluster file annotation; and
    detecting spammer hosts, comprising:
        observing the network flow data from a new host;
        representing the network flow data associated with the new host as a multidimensional vector; and
        placing the new multidimensional vector of the new host into one cluster profile of the one or more cluster profiles.

5. The program according to claim 4, wherein annotating each cluster profile comprises:
    comparing each host in the plurality of cluster profiles with the black lists and the white lists;
    calculating a number of overlapping black list hosts and a number of overlapping white list hosts based on the hosts in the cluster profile;
    when the number of overlapping black list hosts is greater than a threshold value, annotating the cluster profile as a spammer; and
    when the number of overlapping white list hosts is greater than a threshold value, annotating the cluster profile as a non-spammer.

6. The program according to claim 4, wherein placing the new multidimensional vector comprises:
   comparing the new multidimensional vector with each of the plurality of clusters; and
   placing the new multidimensional vector in a cluster having a closest center.

7. A system for spammer host detection from network flow data profiles, comprising:
   a CPU; and
   a module operable to construct one or more cluster profiles and to detect spammer hosts, said construct performed by performing steps of:
      observing network flow data from one or more hosts;
      for each host of the one or more hosts, representing the network flow data associated with the host as a multidimensional vector;
      clustering the one or more vectors of the one or more hosts into the plurality of cluster profiles;
      annotating each cluster profile using at least one of one or more black lists and one or more white lists; and
      calculating a confidence in each cluster profile annotation; and
   said detect performed by performing steps of:
      observing the network flow data from a new host;
      representing the network flow data associated with the new host as a multidimensional vector; and
      placing the new multidimensional vector of the new host into one cluster profile of the one or more cluster profiles.

8. The system according to claim 7, wherein the annotating each cluster profile comprises:
   comparing each host in the plurality of cluster profiles with the black lists and the white lists;
   calculating a number of overlapping black list hosts and a number of overlapping white list hosts based on the hosts in the cluster profile;
   when the number of overlapping black list hosts is greater than a threshold value, annotating the cluster profile as a spammer; and
   when the number of overlapping white list hosts is greater than a threshold value, annotating the cluster profile as a non-spammer.

9. The system according to claim 7, wherein the placing the new multidimensional vector comprises:
   comparing the new multidimensional vector with each of the plurality of clusters; and
   placing the new multidimensional vector in a cluster having a closest center.

* * * * *

UNITED STATES PATENT AND TRADEMARK OFFICE
CERTIFICATE OF CORRECTION

| | | |
|---|---|---|
| PATENT NO. | : 8,769,677 B2 | Page 1 of 1 |
| APPLICATION NO. | : 13/547174 | |
| DATED | : July 1, 2014 | |
| INVENTOR(S) | : Vashist et al. | |

It is certified that error appears in the above-identified patent and that said Letters Patent is hereby corrected as shown below:

On the Title Page, in item (56), under "OTHER PUBLICATIONS", in Column 2, Line 10, delete "Proceedingsof" and insert -- Proceedings of --, therefor.

On Title Page 2, in item (56), under "OTHER PUBLICATIONS", in Column 1, Line 7, delete "SPammers" and insert -- Spammers --, therefor.

In the Specification

In Column 3, Line 18, delete "carded" and insert -- carried --, therefor.

Signed and Sealed this
Eleventh Day of November, 2014

Michelle K. Lee
*Deputy Director of the United States Patent and Trademark Office*